United States Patent [19]

Hyodo

[11] Patent Number: 5,075,719

[45] Date of Patent: Dec. 24, 1991

[54] LENS DRIVING DEVICE

[75] Inventor: Haruhiro Hyodo, Toyohashi, Japan

[73] Assignee: Minolta Camera Kabushiki, Osaka, Japan

[21] Appl. No.: 601,989

[22] Filed: Oct. 23, 1990

[30] Foreign Application Priority Data

Oct. 24, 1989 [JP] Japan .................................. 1-277384

[51] Int. Cl.[5] ............................................ G03B 27/52
[52] U.S. Cl. .................................................... 355/55
[58] Field of Search ........................ 355/32, 35, 55, 56, 355/57

[56] References Cited

U.S. PATENT DOCUMENTS 4,531,831 7/1985 Kitajima et al. ...................... 355/57
4,901,107 2/1990 Iwamoto et al. ..................... 355/55

FOREIGN PATENT DOCUMENTS 59-46348 3/1984 Japan .
63-30797 12/1988 Japan .

Primary Examiner—Richard A. Wintercorn
Attorney, Agent, or Firm—Kenneth L. Sherman

[57] ABSTRACT

A lens driving device having a lens mount integrated with a lens as a unit, a drive rope with convex stripes on its surface, pulleys disposed on the lens mount and having gear tooth channels which engage the convex stripes formed on the drive rope, lens drive gears disposed on the lens mount and having a drive linkage to the pulleys respectively, and a lens guide member with a rack portion which engages with the lens drive gears. The pulleys rotate with the movement of the drive rope and the drive gears rotate interlocking with the rotation of the pulleys so as to move the lens mount along the lens guide member. In case of using a zoom lens with a zoom ring, the lens driving device has gear tooth channel formed on the zoom ring which engages with the convex stripes formed on the drive rope so as to rotate the zoom ring in accordance with the movement of the drive rope.

5 Claims, 7 Drawing Sheets

LENS DRIVING DEVICE

BACKGROUND OF THE INVENTION

1. Field of the Invention

The present invention relates to a lens driving device that moves a lens along an optical path for use in a variable magnification optical system in a copying machine, image reading device and the like.

2. Description of the Related Art

Copying machines having variable magnification copying functions require that a projection lens be movable along the optical path. In such cases two types of lenses are typically used, a fixed-focus lens and a zoom lens.

Conventional lens driving devices that move a fixed-focus lens typically have a rope attached to a lens mounting bed and cause said rope to travel by rotating a pulley. Lens driving devices using a zoom lens, in addition to the aforesaid moving mechanism comprising a rope and pulley, provide a second mechanism that changes the focal distance of the lens itself in correspondence with the movement of said lens.

For example, Japanese Utility Model Application No. 59-46348 discloses the previously described lens moving mechanism comprising a rope and a pulley and an additional cam mechanism which rotates a zoom ring in connection with the movement of the lens.

In the previously described conventional lens driving device, however, slipping may readily occur at the winding portion of the rope and pulley. When a slip occurs, the rope travel not only becomes imprecise, but a loss of drive torque is also induced so that drive efficiency is impaired.

Thus, the rope must have excess winding on the pulley so as to relieve said slip. However, such an arrangement has the disadvantage of complicating assembly. Further, the point of attachment of the rope to the lens mounting bed also has disadvantages inasmuch as it produces a deleterious effect on the assembly operation.

On the other hand, when a zoom lens is used as the lens, a mechanism is required to operate the zoom ring, thereby having the disadvantage of enlarging the size of the device.

SUMMARY OF THE INVENTION

A first object of the present invention is to provide a lens driving device capable of effecting high-precision movement of the lens in accordance with variable copy magnification combined with an easy assembly operation.

A second object of the present invention is to provide a simplified mechanism for operating a zoom ring in concert with lens movement according to variable copy magnification when a zoom lens is used in the lens driving device.

The first object of the present invention is accomplished by a lens driving device providing a lens mount driven with the lens as an integrated unit, a drive rope having convex stripes on its exterior surface, pulleys disposed on the aforesaid lens mount and having gear tooth channels which engage said convex stripes formed on the aforesaid drive rope such that each meshes one with the other so as to rotate the pulleys with the movement of the aforesaid drive rope, lens drive gears disposed on the aforesaid lens mount and having a drive linkage to the aforesaid pulleys respectively, and a lens guide member comprising a rack portion which engages with the aforesaid lens drive gears such that each meshes one with the other.

The second object of the present invention is accomplished by a lens driving device having the aforesaid construction and provided a zoom lens and also provided a zoom ring with a mechanism for operating said zoom ring in accordance with the movement of the aforesaid drive rope, said mechanism comprising a gear tooth channel formed on said zoom ring which engages with the convex stripes formed on the aforesaid drive rope such that each meshes one with the other.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 1 is a brief overview of the device.

FIG. 2 is an elevation view of the device shown in FIG. 1 as seen from the lens front side.

FIG. 3 is a perspective view showing engagement of the lens drive gear and rack portion of the guide plate.

FIG. 4 is an elevation view showing a portion of the drive rope.

FIG. 5 is a section view showing the drive rope wound around the pulley.

FIG. 6 is a simple construction diagram showing the essential portion of the copying machine.

FIG. 7 is a brief overview of the device provided with a zoom lens.

FIG. 8 is an elevation view of the device shown in FIG. 7 as seen from the lens front side.

FIG. 9 shows the construction of the zoom lens.

FIG. 10 is a section view showing the engagement of the zoom ring and the drive rope.

DETAILED DESCRIPTION OF THE PREFERRED EMBODIMENTS

The preferred embodiments of the present invention are described in detail hereinafter with reference to the accompanying drawings.

First Embodiment

FIGS. 1 through 6 show a first embodiment of the lens driving device of the present invention.

Figure 6:
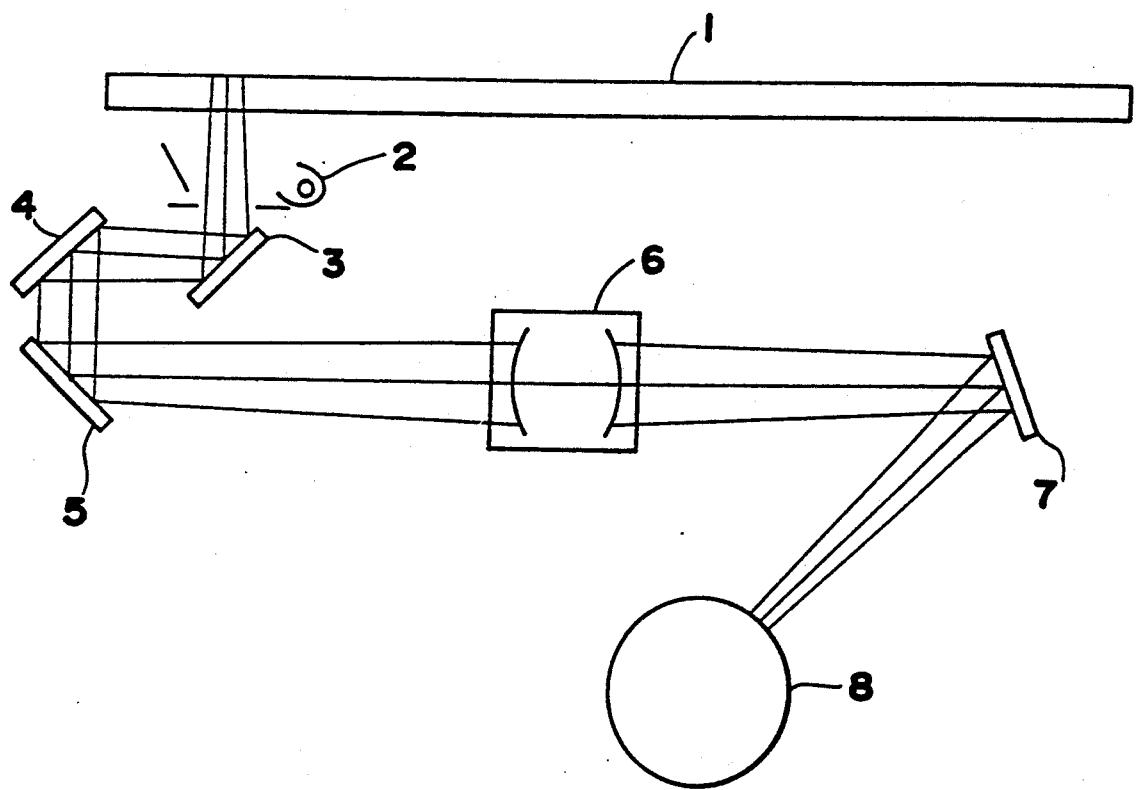
Figure 7:
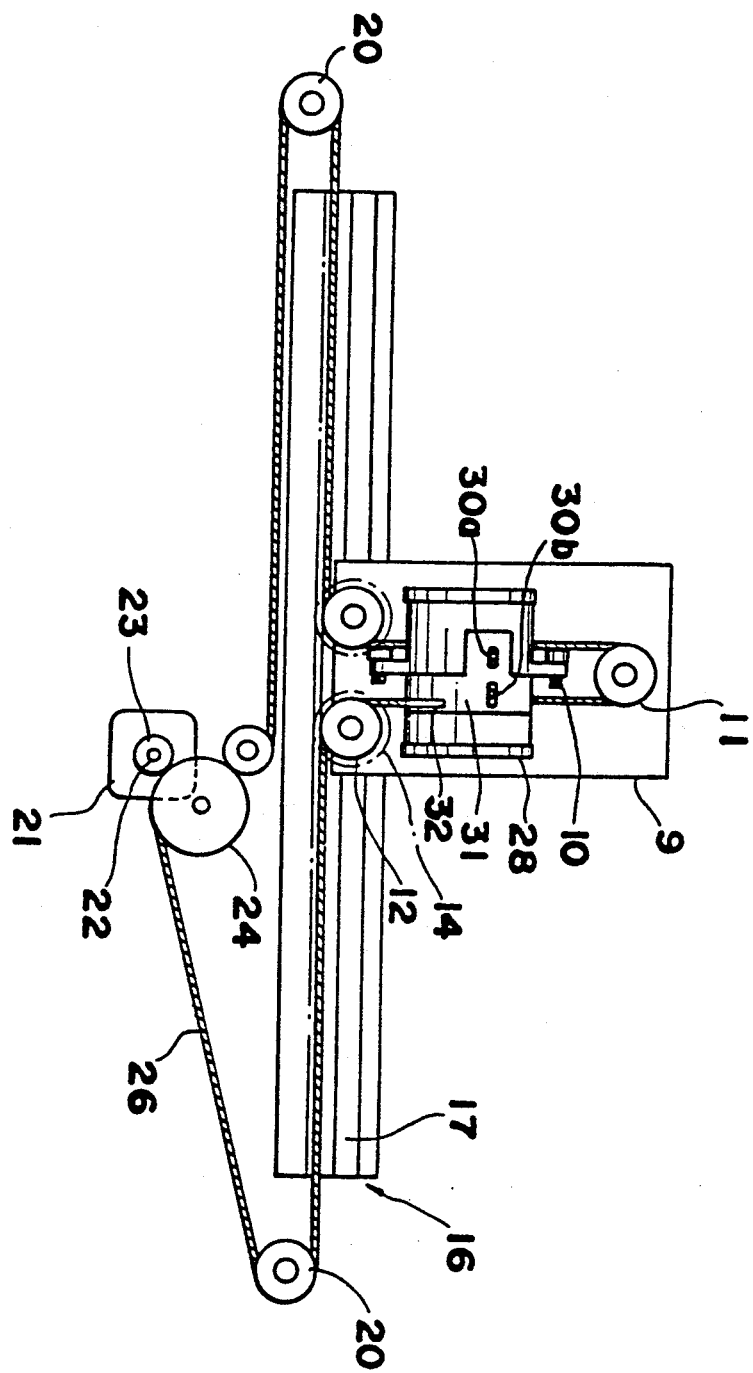
FIGS. 7 through 10 show a second embodiment of the invention.
Figure 8:
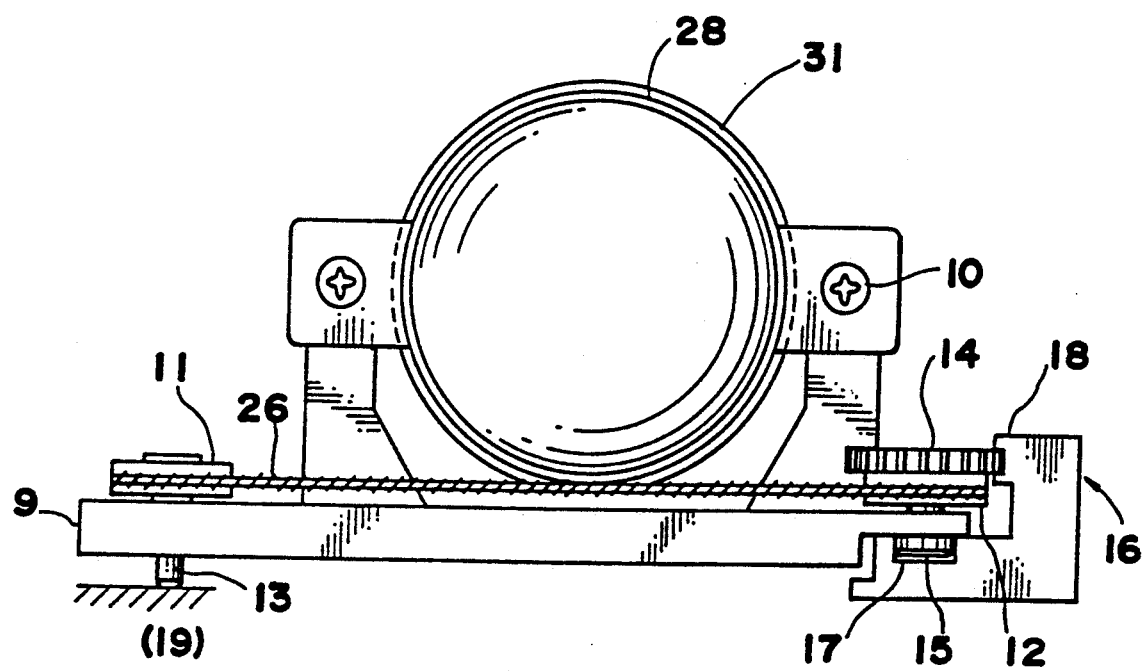

FIG. 6 shows the essential portion of a copying machine capable of variable copy magnification. The aforesaid copying machine provides an original document glass platen 1, exposure lamp 2, first reflecting mirror 3, second reflecting mirror 4, third reflecting mirror 5, lens 6, fourth reflecting mirror 7, and a photoconductive drum 8. Exposure lamp 2 and first reflecting mirror 3 scan toward the right side in the drawing along document platen 1 at a speed equal to the peripheral speed V of photoconductive drum 8, and second and third reflecting mirrors 4 and 5 scan in the same direction but at ½ the speed (V/2). Light reflected from document glass platen 1 is projected onto the surface of photoconductive drum 8 while the length of the optical path from the surface of the original document to the surface of photoconductive drum 8 is maintained so as to be constant.

In the previously described construction, when magnification is changed from the equal magnification copy state shown in the drawings to a reduced magnification copy state, lens 6 shown in FIG. 6 is caused to travel rightwardly in the drawing along the optical path by means of a lens driving device described later, and fourth reflecting mirror 7 correspondingly is caused to travel rightwardly in the drawing along the optical path, such that the length of the optical path increases from the original document (not shown in the drawing) to photoconductive drum 8. When enlargement copies are made, the reverse of the previously described operation occurs, to wit, lens 6 is caused to travel leftwardly while reflecting mirror 7 is caused to travel rightwardly along the optical path so as to make adjustment to a specified magnification.

Figure 1:
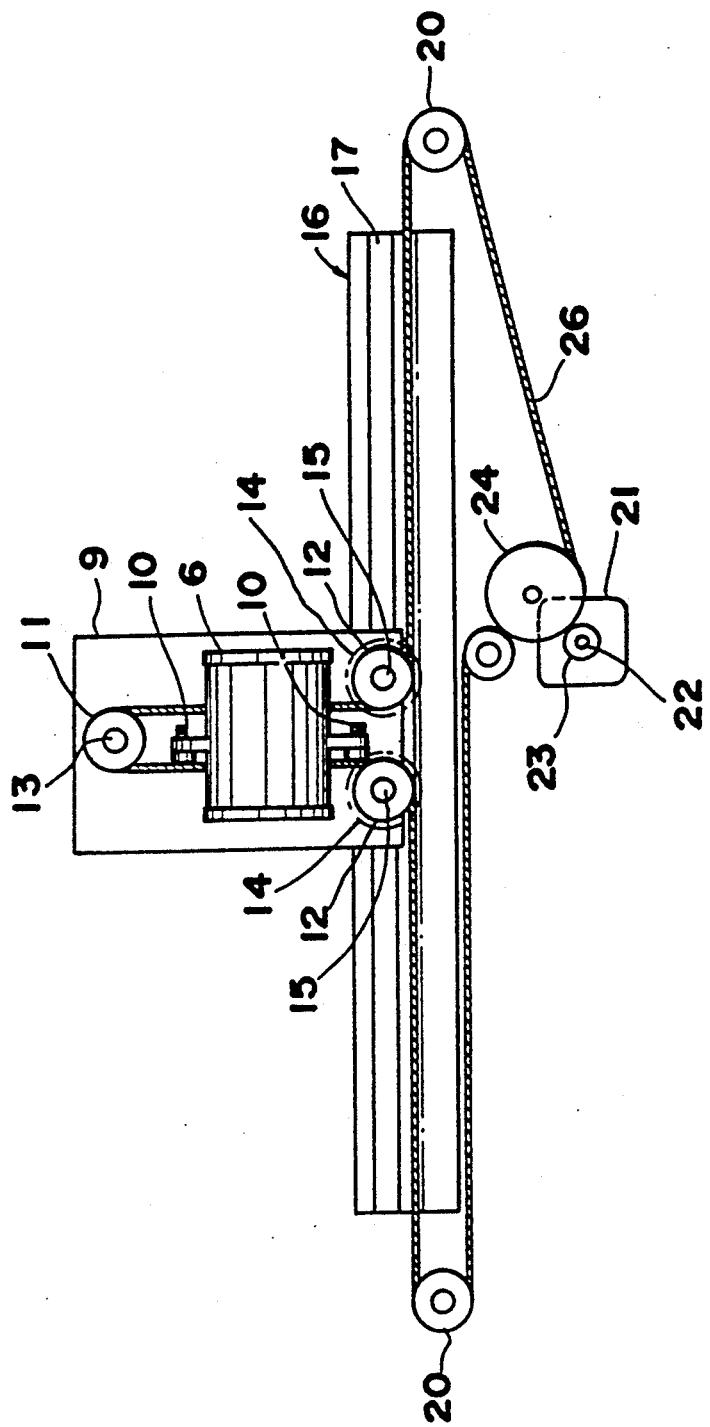
FIGS. 1 through 6 show a first embodiment of the lens driving device of the present invention.
Figure 2:
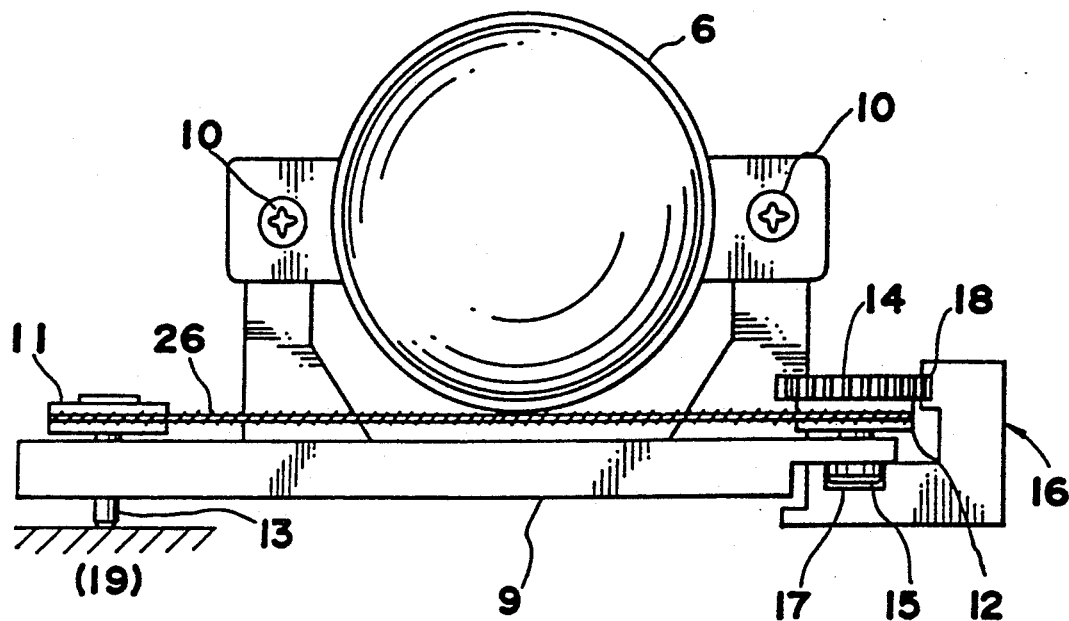

FIG. 1 is a simplified drawing which shows the construction of the previously mentioned lens driving device. FIG. 2 shows the same lens driving device of FIG. 1 as viewed from the front side of the lens.

This lens driving device mainly comprises a lens 6, disposed on a lens mount 9, guide plate 16 which allows lens mount 9 to travel along the optical axis of lens 6, lens driving motor 21, and a synchromesh drive rope 26 which transmits the drive torque of lens drive motor 21 to lens mount 9.

More specifically, lens 6 is fixedly attached on lens mount 9 by a pair of screws 10. An idle pulley 11 and two lens drive pulleys 12 are provided on lens mount 9. A pin 13 is disposed at the center of idle pulley 11 at one end of lens mount 9 so as to protrude from said lens mount 9. Further, a pair of drive pulleys 12 are provided at the other end of lens mount 9, and a pair of lens drive gears 14 are, as shown in FIG. 2, provided on top of and having the same axes as said lens drive pulleys 12 so as to form single integrated units, and guide pins 15 are provided at the bottom of said drive pulleys 12 so as to protrude from the bottom of lens mount 9.

Figure 3:
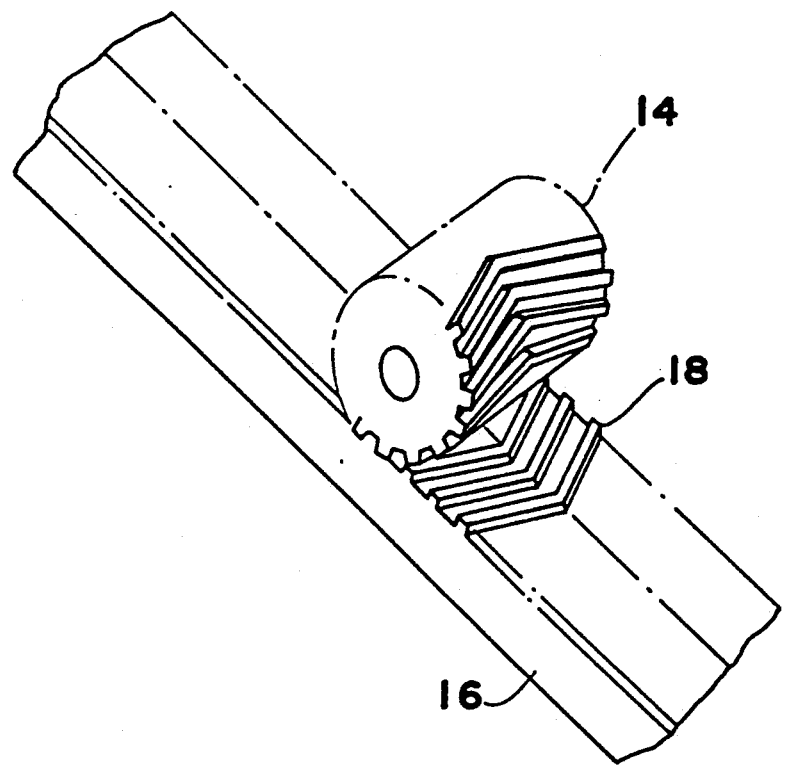

Guide plate 16 for guiding the aforesaid lens mount 9 along the optical axis of lens 6 comprises a linear channel portion 17 that accepts the insertion of guide pins 15 thereto, and linear rack portion 18 which engages lens drive gears 14 so as to mesh therewith. The shape of the gear teeth of lens drive gears 14 and lens drive gear engaging rack 18 are respectively herringbone-shaped, as shown in FIG. 3, but otherwise may have a flat spur, skew bevel or like configuration.

Lens mount 9 having the previously described construction is guided in the direction of the optical axis of lens 6 by guide pins 15, and the height of the optical axis is regulated by controlling the amount by which pin 13 protrudes against to base plate 19.

On the other hand, two idle pulleys 20 are disposed such that one is opposite each end of guide plate 16 in the lengthwise direction. Drive shaft 22 of lens drive motor 21 has a drive gear 23 mounted thereto so as to form a drive linkage with drive pulley 24 through a gear not shown in the drawings.

Figure 4:
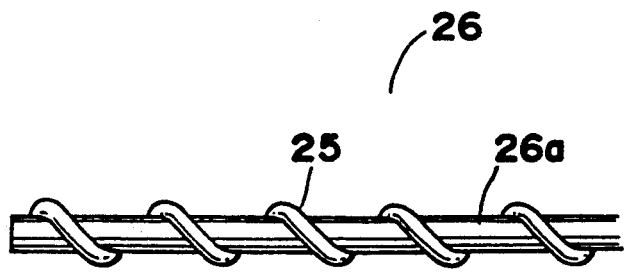

A synchromesh drive rope 26 comprising a spiral convexity 25 provided on the exterior surface of a rope 26a, as shown in FIG. 4, is looped around the aforesaid drive pulley 24, pair of lens drive pulleys 12, and each of the idle pulleys 11 and 20.

A synchromesh rope may be used in the present invention such as, for example, that disclosed in Japanese Patent Application No. 63-3079751. This synchromesh rope comprises a rope 26a which is a wire rope having a plurality of twisted wire strands of stainless or like metal the exterior of which is protected by a covering of polyurethane, polyamide or like resin, the exterior surface of said rope 26a also being provided a spiral convexity 25 formed by a line of polyurethane, polyamide or like resin. However, synchromesh rope 26 is not limited to the previously described configuration and construction and may use a pliable rope 26a which has a high tensile strength, to wit, a rope that is difficult to stretch, and possesses excellent wear resistance characteristics against operational fatigue and the like, and which provides on its exterior surface a spiral convexity 25 formed of a material having excellent abrasion resistance. For example, a synchromesh rope may be used wherein a polyamide or like resin rope is used as rope 26a, which is provided directly on its exterior surface a convexity 25 formed by a resin line of polyurethane, polyamide or like resin.

Figure 5:
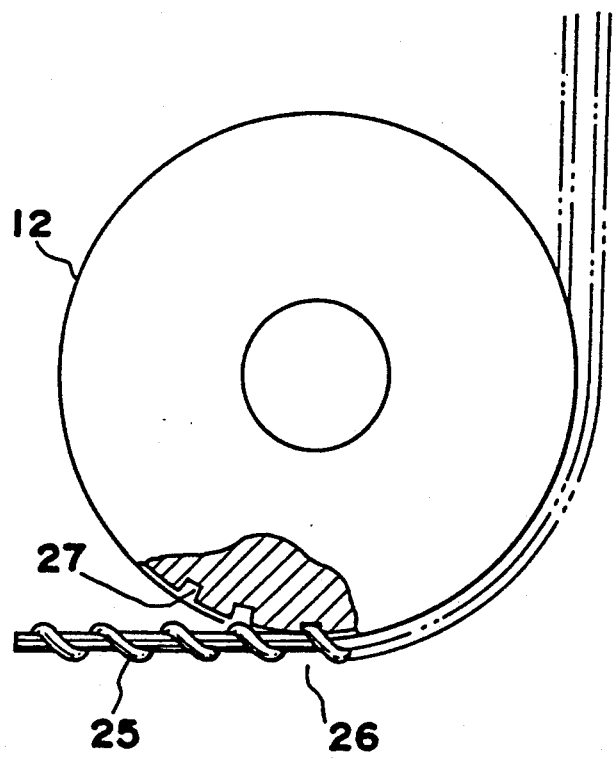

Synchromesh rope 26 is looped around lens drive pulley 12 which is provided a gear tooth channel 27 that engages and meshes with the convexity 25 of synchromesh rope 26, as shown in FIG. 5. Other pulleys 11, 20 and 24 are formed so as to have gear tooth channels 27 identical to that of lens drive pulley 12, each of said gear tooth channels 27 being formed so as to engage and mesh with the convexity 25 of synchromesh rope 26. Idle pulley 11 may also be formed without the aforesaid gear tooth channel 27 which engages the convexity 25.

In the previously described construction, lens drive motor 21 receives a variable magnification signal from a control circuit not shown in the drawings, and is rotated a specified amount only. Then, drive gear 23 rotates drive pulley 24. As drive pulley 24 rotates, the convexities 25 of synchromesh rope 26 looped around said drive pulley 24 sequentially engage and mesh with the gear tooth channel 27 of drive pulley 24 so that synchromesh rope 26 is caused to travel. When synchromesh rope 26 travels, the convexities 25 on synchromesh rope 26 sequentially engage and mesh with the gear tooth channels 27 of each pulley 11, 12 and 20 around which said synchromesh rope 26 is looped so as to cause said each pulley 11, 12 and 20 to be rotated. The direction of rotation of the two lens drive pulleys 12 is the reverse of the rotational direction of the other pulleys 11, 20 and 24. In accordance with the rotation of both lens drive pulleys 12, both lens drive gears 14, which are connected to the same axes as said pulleys 12, are caused to rotate in the same rotational direction as the respective lens drive pulleys 12. Both the rotated lens drive gears 14 engage with rack 18 of guide plate 16, and lens mount 9 is driven along said guide plate 16.

When, for example, reduction copies are made in FIG. 1, drive pulley 24 is rotated counterclockwise by lens drive motor 21. In accordance with the rotation of drive pulley 21, a drive torque in the clockwise direction is transmitted to both lens drive pulleys 12 through synchromesh rope 26. Lens drive gears 14, which are disposed on the same axes as the two lens drive pulleys 12, are caused to rotate in the clockwise direction by the drive torque transmitted through synchromesh rope 26, and lens mount 9 is driven rightwardly in the drawing along guide plate 16. When enlargement copies are made, on the other hand, drive pulley 24 and both lens drive gears 14 are rotated in the reverse direction to the rotational direction previously described for reduction copies, and lens mount 9 is driven leftwardly in the drawing along guide plate 16.

Second Embodiment

FIGS. 7 through 10 show a second embodiment of the invention.

The Second Embodiment is a lens driving device having a variable focal length zoom lens 28 which can be moved along the optical path, to wit, a lens driving device capable of varying the focal length in linkage with the movement of the lens.

Figure 9:
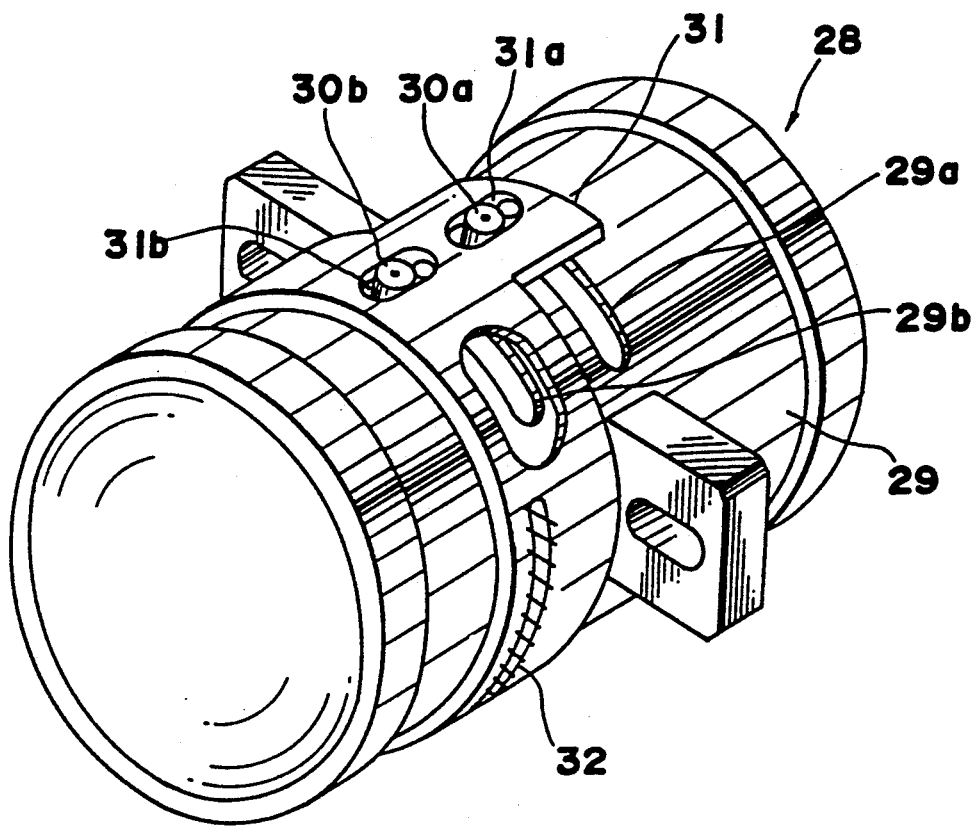

The construction of the zoom lens used in the present embodiment is hereinafter described with reference to FIG. 9. Zoom lens 28 changes the focal length by moving the two-part movable zoom lens group (not shown in the drawing) relative to the optical axis direction within lens barrel 29 so as to vary the projection magnification while maintaining a constant optical path length.

The two-part movable zoom lens group is provided guide pins 30a and 30b inside lens barrel 29. These guide pins 30a and 30b are respectively linked to straight cams 31a and 31b and curvilinear cams 29a and 29b so as to be oscillatable, said straight cams 31a and 31b being formed on zoom ring 31 which is rotatable on the center axis of the lens barrel, and said curvilinear cams 29a and 29b being formed on lens barrel 29. The previously mentioned zoom ring 31 is provided a gear tooth channel 32 which engages and meshes with convexity 25 of synchromesh rope 26.

Since the construction that implements the movement of lens mount 9, upon which the aforesaid zoom lens 28 is disposed, along guide plate 16 is identical to that described in the First Embodiment, details of its description are omitted herefrom.

Figure 10:
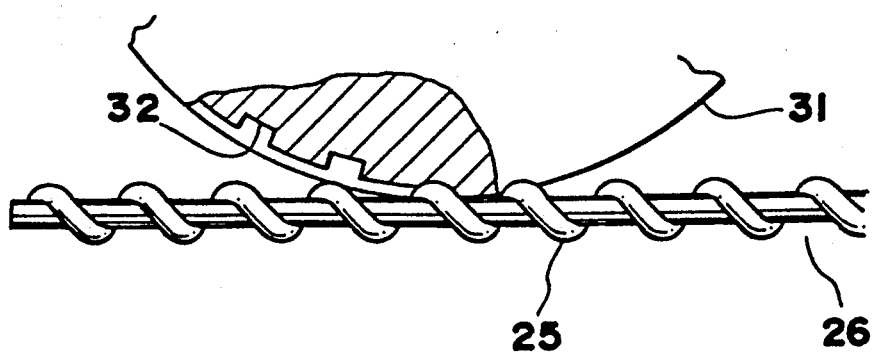

In the present embodiment, the previously described zoom lens 28 is so constructed that when disposed on lens mount 9, the gear tooth channel 32 of zoom ring 31 engages and meshes with the convexity 25 of synchromesh rope 26 at the bottom of said zoom ring 31, as shown in FIG. 10.

In the previously described construction, when synchromesh rope 26 is caused to travel, lens mount 9 is driven in the direction of the optical axis by the operation described in the First Embodiment. The convexities 25 of synchromesh rope 26 sequentially engage and mesh with the gear tooth channel 32 of zoom ring 31 in concert with the aforesaid driven travel of lens mount 9, such that zoom ring 31 is rotated around the center axis of the lens barrel. Guide pins 30a and 30b oscillate with curvilinear cams 29a and 29b and straight cams 31a and 31b by means of the rotation of zoom ring 31. Accordingly, the two-part movable zoom lens group (not shown in the drawing) is moved in the direction of the optical axis by the guidance of guide pins 30a and 30b so as to adjust and regulate the focal length.

As being obvious from the above, the present invention provides a lens driving device for moving a lens along an optical path, said lens driving device comprising a drive rope which has a spiral convexity on the exterior surface of a rope for transmitting lens driving torque by sequentially engaging and meshing the convexity of said drive rope with gear tooth channels of pulleys around which the drive rope is looped. Accordingly, the loss of drive torque caused by a slip at the pulley portions does not happen, thus effective lens driving can be accomplished. Further, because there is no need to provide excess winding of the rope on the pulleys, an easy assembly operation is accomplished. Moreover, since lens driving is accomplished by engaging and meshing of gears, lens positioning is not influenced by the power of the rope, thus lens driving of great precision can be attained stably.

Further, in case of using a zoom lens with a zoom ring as the lens, both lens driving and zoom ring adjusting operation can be accomplished effectively by mere travelling of rope, thus the construction of whole apparatus can be simplified.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being contained therein.

What is claimed is:

1. A lens driving device including a zoom lens comprising:
   a lens holding member driven with the zoom lens as an integrated unit and being movable in a direction of optical axis of the zoom lens;
   a drive rope having convex stripe on its surface;
   a zoom ring rotatably incorporated into said zoom lens and having a gear tooth channel on its surface which engages with the convex stripes formed on said drive rope;
   pulleys disposed on said lens holding member and provided with gear tooth channels which engages said convex stripes formed on said drive rope for being operated to move said holding member wherein both of said zoom ring and said pulleys are operated in accordance with the movement of said drive rope;
   lens drive gears disposed on said lens holding member and having drive linkage to said pulleys respectively; and
   lens guide member engaging with said lens drive gears for moving said lens holding member therealong.

2. The lens driving device as claimed in claim 1, wherein said lens guide member has a rack portion provided with gear tooth channels for engaging with said lens drive gears.

3. The lens driving device as claimed in claim 1 further comprising an idle pulley provided on one end of said lens holding means.

4. The lens driving device as claimed in claim 3, wherein said idle pulley is provided with gear tooth channels which engages said convex stripes formed on said drive rope.

5. A lens driving device comprising:
   a lens holding member driven with a lens as an integrated unit and being movable in a direction of optical axis of the lens;
   a drive rope having convex stripes on its surface;
   pulleys disposed on said lens holding member and provided with gear tooth channels respectively each of which engage said convex stripes formed on said drive rope to move said lens holding member;
   lens drive gears disposed on said lens holding member and having drive linkage to said pulleys respectively; and
   lens guide member engaging with said lens drive gears for moving said lens holding member therealong wherein said lens guide member has a rack portion provided with gear tooth channels for engaging with said lens drive gears.

* * * * *